(12) United States Patent
Bekavac et al.

(10) Patent No.: US 9,225,223 B2
(45) Date of Patent: Dec. 29, 2015

(54) POWER TOOL

(71) Applicants: Miro Bekavac, Korntal-Muenchingen (DE); Joachim Heizmann, Immendingen (DE); Sebastian Laber, Leinfelden-Echterdingen (DE); Patrick Budaker, Heubach (DE)

(72) Inventors: Miro Bekavac, Korntal-Muenchingen (DE); Joachim Heizmann, Immendingen (DE); Sebastian Laber, Leinfelden-Echterdingen (DE); Patrick Budaker, Heubach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 230 days.

(21) Appl. No.: 13/928,922

(22) Filed: Jun. 27, 2013

(65) Prior Publication Data

US 2014/0001892 A1      Jan. 2, 2014

(30) Foreign Application Priority Data

Jun. 28, 2012   (DE) .......................... 10 2012 211 183

(51) Int. Cl.
*H02K 7/14*     (2006.01)
*H02K 29/08*    (2006.01)
*H02K 3/52*     (2006.01)
*H02K 11/00*    (2006.01)

(52) U.S. Cl.
CPC ................ *H02K 7/145* (2013.01); *H02K 3/522* (2013.01); *H02K 11/0073* (2013.01); *H02K 29/08* (2013.01)

(58) Field of Classification Search
USPC .......................... 310/50, 71, 68 B, 413–415
See application file for complete search history.

(56) References Cited

U.S. PATENT DOCUMENTS

| | | | | |
|---|---|---|---|---|
| 4,910,420 | A * | 3/1990 | Hoover et al. ............... | 310/68 B |
| 5,877,574 | A * | 3/1999 | Molnar ......................... | 310/215 |
| 5,895,994 | A * | 4/1999 | Molnar et al. ................ | 310/215 |
| 2005/0212367 | A1* | 9/2005 | Blase et al. .................. | 310/68 B |
| 2010/0109458 | A1* | 5/2010 | Hauser et al. ................. | 310/71 |

* cited by examiner

*Primary Examiner* — Thanh Lam
(74) *Attorney, Agent, or Firm* — Kenyon & Kenyon LLP

(57) ABSTRACT

In a power tool having an electronically commutated drive motor to which stator components are assigned, which stator components have a stator core equipped with an insulating body, a positioning unit is provided on the insulating body. The positioning unit is designed to enable a positioning of a circuit board, which is assigned to the drive motor, in a predefined alignment on the insulating body.

8 Claims, 4 Drawing Sheets

POWER TOOL

BACKGROUND OF THE INVENTION

1. Field of the Invention

The present invention relates to a power tool having an electronically commutated drive motor to which stator components are assigned having a stator core equipped with an insulating body.

2. Description of the Related Art

Such a power tool having an electronically commutated drive motor and stator components assigned to it is known from the related art. In addition, a circuit board, on which Hall sensors are provided for detection of a magnetic field of a rotor, which is induced to rotate by the stator components during operation of the drive motor, is assigned to the drive motor of such a power tool, to thereby enable a determination of the rotational position of the rotor. The circuit board is mounted in a predefined position in or on the drive motor.

One disadvantage of the related art is that either a screw connection or a special receptacle is necessary for positioning the circuit board in or on the drive motor, and the receptacle must in turn be mounted and secured in or on the drive motor. This is, however, time consuming and cost intensive and lengthens, i.e., complicates the manufacture of such a power tool.

BRIEF SUMMARY OF THE INVENTION

One object of the present invention is therefore to provide a novel power tool having an electronically commutated drive motor, so that an assigned circuit board may be positioned easily and quickly in or on the drive motor during its manufacture.

This problem is solved by a power tool having an electronically commutated drive motor to which stator components having a stator core equipped with an insulating body are assigned, a positioning unit being provided on the insulating body which is designed to permit positioning of a circuit board assigned to the drive motor in a predefined alignment on the insulating body.

The present invention thus makes it possible to provide a power tool having an electronically commutated drive motor in which positioning of an assigned circuit board in or on the drive motor is enabled by utilizing components with their manufacturing concepts which are already present and assigned to the stator components. This simplifies and accelerates the manufacture of the drive motor and the power tool and makes it less expensive accordingly.

The positioning unit is preferably designed to enable mounting of the circuit board on the insulating body.

The circuit board may thus be mounted reliably and securely on the stator components in a predefined alignment.

According to one specific embodiment, the circuit board is provided with at least one rotational direction sensor, which is situated in a predefined axial position in the drive motor due to the positioning of the circuit board on the insulating body.

The present invention thus makes it possible to provide a power tool, in which a precise alignment of an assigned rotational direction sensor in or on the drive motor is made possible in a simple manner.

The positioning unit preferably has at least two positioning elements which are situated in a predefined configuration on the insulating body.

A robust and stable positioning unit may thus be made available.

The insulating body and the positioning elements are preferably made of plastic in at least some areas, the positioning elements being integrally molded on the insulating body and/or designed in one piece with the insulating body.

An uncomplicated and inexpensive positioning unit may thus be made available.

At least two positioning receptacles for accommodating the at least two positioning elements are preferably formed on the circuit board.

This permits a rapid and accurately positioned alignment and configuration of the circuit board on the stator components.

The positioning elements are preferably designed in the form of pins, and the positioning receptacles are formed in the manner of positioning openings through which the positioning elements pass.

Inexpensive and robust positioning elements and receptacles may thus be made available.

According to one specific embodiment, the positioning elements are fused in at least some sections in the area of the positioning receptacles for mounting the circuit board on the insulating body, in particular by hot staking.

The present invention thus makes it possible to provide a power tool in which the circuit board may be mounted on the stator components in or on the drive motor in a stable and reliable manner.

The positioning elements are preferably situated asymmetrically on the insulating body with respect to a longitudinal axis of the stator components.

This permits a rapid and precise alignment of the circuit board on the insulating body during its assembly in or on the drive motor.

Four positioning elements are preferably provided and are situated in a trapezoidal pattern on the insulating body.

This permits a reliable and robust mounting of the circuit board on the insulating body.

In addition, the problem mentioned at the outset is also solved by an electronically commutated drive motor, in particular for a power tool, which is provided with stator components having a stator core equipped with an insulating body, a positioning unit being provided which is designed to permit positioning of a circuit board assigned to the drive motor in a predefined alignment on the insulating body.

DETAILED DESCRIPTION OF THE INVENTION

Figure 1:
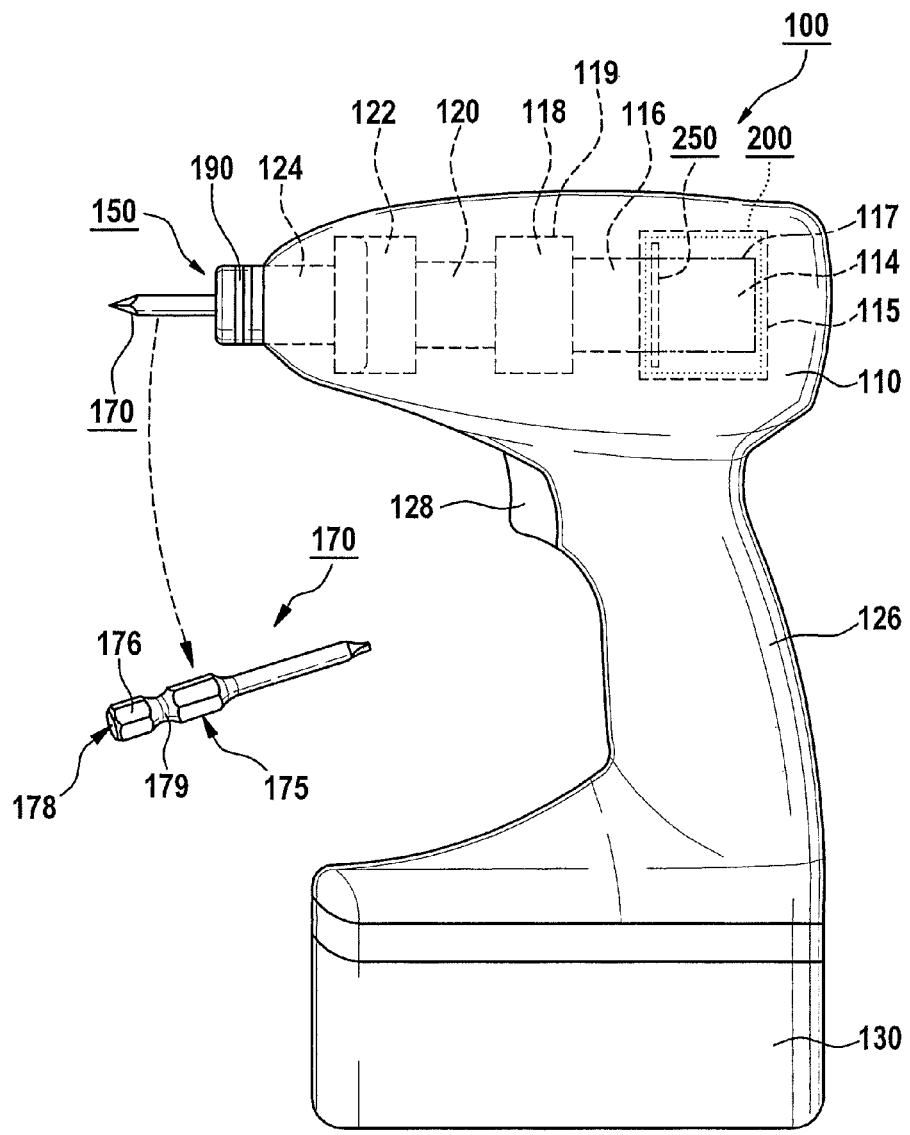
FIG. 1 shows a schematic view of a power tool having an electronically commutated drive motor according to one specific embodiment.

FIG. 1 shows a power tool 100, which is equipped with a tool receptacle 150 and has a housing 110 including a handle 126. According to one specific embodiment, power tool 100 is mechanically and electrically connectable to a battery pack 130 for a cordless power supply.

Power tool 100 is designed as a cordless drill combo, for example. However, it is pointed out that the present invention is not restricted to cordless drill combos but instead may be applied to different power tools, e.g., a screwdriver, a drilling screwdriver, a percussion drill, a saw, a grinding machine, a milling machine, an electric lawnmower, etc., regardless of whether power tool 100 is mains-operable or cordless-operable using battery pack 130.

An electric drive motor 114, which receives power from battery pack 130, a gear 118 and an optional striking mechanism 122 are situated in housing 110. Drive motor 114 is actuatable, for example, via a manual switch 128, i.e., switchable on and off, and is preferably electronically controllable or adjustable, so that a reverse mode as well as specifications with regard to a desired rotational speed are implementable.

According to one specific embodiment, drive motor 114 is an electronically commutated drive motor, preferably a dc motor which has, for example, at least stator components and rotor components 200 and 117 plus at least one circuit board 250. For example, stator components 200 form an external stator and are described further below in the context of FIGS. 2 and 3, whereas any further description of rotor components 117 forming an internal rotor has been omitted for the purpose of simplicity and succinctness of the description. However, it should be pointed out that the description of a drive motor having an external stator and an internal rotor merely has an exemplary nature and is not to be understood as a restriction on the present invention, which may be used even with a drive motor having an internal stator and an external rotor. In addition, no description is given here of the functionality of the electronically commutated drive motor 114 for the sake of simplicity and succinctness of the description because those skilled in the art are adequately familiar with it.

Drive motor 114 is connected via an assigned motor shaft 116 to gear 118, which converts a rotation of motor shaft 116 into a rotation of a drive member 120, e.g., a drive shaft, which is provided between gear 118 and striking mechanism 122. This conversion preferably takes place in such a way that drive member 120 rotates at an increased torque but a reduced rotational speed in relation to motor shaft 116. Drive motor 114 is situated in a motor case 115, for example, and gear 118 is situated in a gear case 119, gear case 119 and motor case 115 being situated in housing 110, for example.

Optional striking mechanism 122 which is connected to drive member 120 is a rotary striking mechanism, for example, which generates hammer-type rotary pulses of high intensity and transmits them to an output shaft 124, e.g., an output spindle. An example of a striking mechanism with which striking mechanism 122 may be implemented is described in DE 20 2006 014 850 U1, to which reference is explicitly made here and the teachings of which are to be understood as being a part of the present description, so that a detailed description of optional striking mechanism 122 may be omitted here for the purpose of the succinctness of the description.

Tool receptacle 150, which is provided to receive insertion tools having external polygonal couplings, for example, is provided on output shaft 124 and has a locking sleeve 190, for example, for locking these insertion tools in an internal receptacle of tool receptacle 150. Tool receptacle 150 is designed to receive an insertion tool 170 designed in the manner of a screwdriver bit, for example, having a shaft 176 including a coupling contour 175 in an axial end area 178, which is formed by a polygonal cross section, in particular a hexagonal cross section of shaft 176 and an outer ring groove 179 provided on the shaft, e.g., according to DIN 3126-E6.3. Such a screwdriver bit, which may be of the so-called hex-head type as an example, is sufficiently well known in the related art, so that a detailed description is omitted here for the purpose of the succinctness of the description.

However, it should be pointed out that the present invention is not restricted to a use of hex-head screwdriver bits, but instead other insertion tools may also be used, depending on the selected design of tool receptacle 150, e.g., hex drills or so-called SDS quick insertion tools. In addition, it should be pointed out that the present invention is also not restricted to tool receptacles for holding insertion tools having external polygonal couplings but may also be used with tool receptacles for holding insertion tools having internal polygonal couplings and/or tool receptacles for holding insertion tools having external or internal polygonal couplings.

Figure 2:
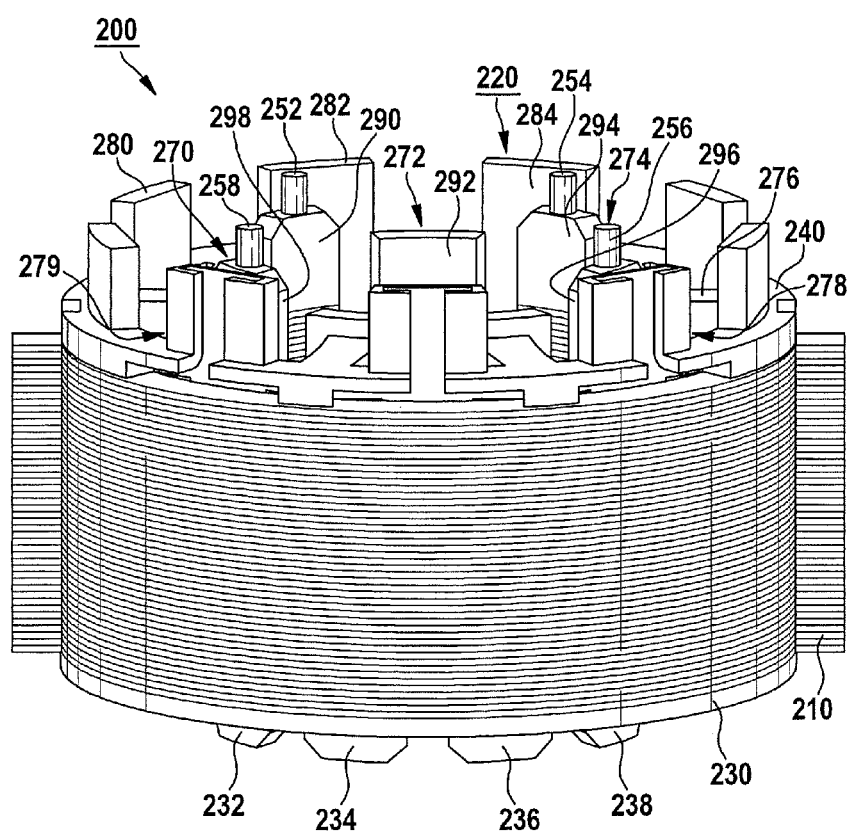
FIG. 2 shows a perspective view of stator components assigned to the electronically commutated drive motor from FIG. 1, having an insulating body equipped with a positioning unit according to one specific embodiment.

FIG. 2 shows stator components 200 of electronically commutated drive motor 114 of power tool 100 of FIG. 1, which have a stator core 210, which is equipped with an insulating body 220 as an example. Stator core 210 has, for example, multiple sheet metal plates stacked one above the other and forms together with insulating body 220 multiple stator poles, e.g., nine stator poles, only six of which are labeled using reference numerals 270, 272, 274, 276, 278, 279 for the purpose of simplicity and clarity of the drawing. Insulating body 220 has as an example at least one first insulating body section 240 and one second insulating body section 230, which are pushed onto the end areas of stator core 210 (from top to bottom in FIG. 2) starting from these mutually axially opposed end areas. To simplify the description, first insulating body section 240 is therefore also referred to below as the "upper insulating body section" and second insulating body section 230 is referred to as the "lower insulating body section."

However, it is pointed out that the two-part design of insulating body 220 having upper and lower insulating body sections 240 and 230 is only of an exemplary nature and is not to be understood as a restriction of the present invention. This may also be used with one-piece insulating bodies formed by plastic injection molding, for example, or multipart, e.g., three-part or four-part insulating bodies.

At least one and, for example, nine external axial extensions are formed on upper insulating body section 240, only three of which are labeled using reference numerals 280, 282, 284 here for the purpose of simplicity and clarity of the drawing. These may help to align and fasten stator components 200 in motor case 115 of FIG. 1, for example, during a manufacture of drive motor 114 of FIG. 1.

In addition, at least one and, for example, nine internal axial extensions are formed on upper insulating body section 240, only five of which are labeled using reference numerals 290, 292, 294, 296, 298 for the sake of simplicity and clarity of the drawing. Corresponding internal axial extensions may be provided on lower insulating body section 230 for this purpose, only four of these being labeled using reference numerals 232, 234, 236, 238 for the sake of simplicity and clarity of the drawing. Internal axial extensions 290, 292, 294, 296, 298, 232, 234, 236, 238 help to secure an assigned motor winding (260 in FIG. 3) radially on stator poles 270, 272, 274, 276, 278, 279.

According to one specific embodiment, a positioning unit 252, 254, 256, 258 is provided on insulating body 220, designed at least to enable positioning of circuit board 250 of FIG. 1 in a predefined alignment on insulating body 220, the circuit board being assigned to drive motor 114 of FIG. 1. In addition, positioning unit 252, 254, 256, 258 may be designed to also enable a mounting of circuit board 250 of FIG. 1 on insulating body 220.

For the sake of illustration, positioning unit 252, 254, 256, 258 is formed on upper insulating body section 240 and has at least two and, for example, four positioning elements 252, 254, 256, 258, which are situated in a predefined arrangement on insulating body 220. This arrangement is asymmetrical with respect to a longitudinal axis of stator components 200. Positioning elements 252, 254, 256, 258 are designed as pins in the example and are situated on inner axial extension 290, 294, 296 and 298. Insulating body 220 and positioning elements 252, 254, 256, 258 are made of plastic in at least some areas here, so that positioning elements 252, 254, 256, 258 may be integrally molded on insulating body 220 and/or may be designed in one piece with the latter.

Figure 3:
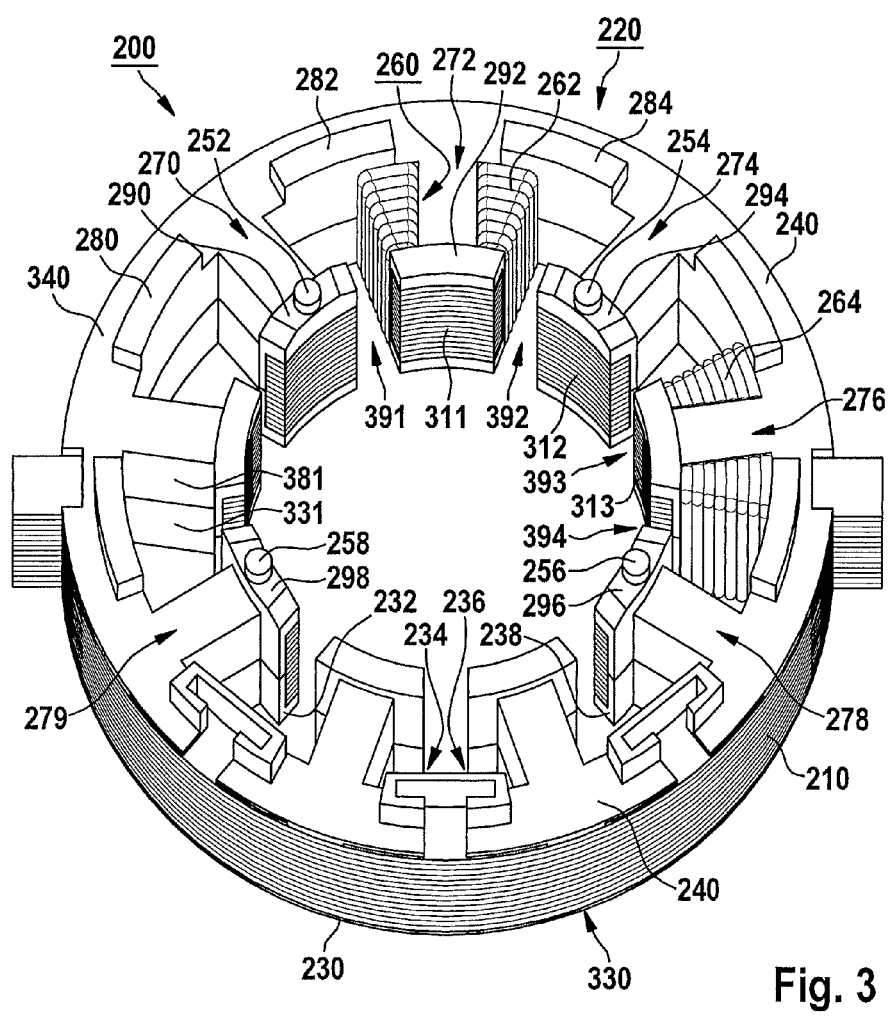
FIG. 3 shows a perspective top view of the stator components from FIG. 2.

FIG. 3 shows stator components 200 of FIG. 2 for illustration of pin-shaped positioning elements 252, 254, 256, 258 of positioning unit 252, 254, 256, 258 formed on upper insulating body section 240 of insulating body 220 as an example. In addition, FIG. 3 shows as an example a motor winding 260, which is provided on stator components 200 and is wound by any suitable winding method onto stator core 210, which is provided with insulating body 220 and may have multiple interconnected individual coils. For example, only two individual coils are labeled using reference numerals 262, 264 for the sake of simplicity and clarity of the drawing, these coils being situated on stator poles 272 and 276 as an example. Insulating body 220 according to one specific embodiment is held on stator core 210 by motor winding 260.

Stator core 210 has multiple T-shaped stator teeth, only three of which are labeled using reference numerals 311, 312, 313 for the sake of simplicity and clarity of the drawing, winding grooves for accommodating motor winding 260 or individual coils 262, 264 being formed between the stator teeth. Only four winding grooves are labeled using reference numerals 391, 392, 393, 394 here for the purpose of simplicity and clarity of the drawing. For insulation of these winding grooves 391, 392, 393, 394 in at least some sections, multiple column-type groove insulators are formed on the lower insulating body section 230 as an example, e.g., on an insulator plate 330, one of which is labeled using reference numeral 331 as an example. Corresponding to this, multiple column-type groove insulators are formed on an annular supporting member 340 which is provided for support on stator core 210 on upper insulating body section 240 as an example, one of these groove insulators being labeled using reference numeral 381 as an example and also being provided for insulation of winding grooves 391, 392, 393, 394 in at least some sections.

Outer axial extensions 280, 282, 284 are formed on annular supporting member 340 as an example and are situated here in the area between adjacent stator poles. Outer axial extension 282, for example, is situated in the area between stator poles 270 and 272, outer axial extension 284 being situated in the area between stator poles 272 and 274, etc. Inner axial extensions 290, 292, 294, 296, 298, 232, 234, 236, 238 are each situated on the radially opposite ends of stator poles 270, 272, 274, 276, 278 and 279 on so-called head sections of stator teeth 311, 312, 313. As described with regard to FIG. 2 above, this configuration helps to radially support or secure motor winding 260 or individual coils 262, 264 on stator poles 270, 272, 274, 276, 278, 279 as illustrated, for example, on the basis of the radial support of individual coil 262 by inner axial extension 292 on stator tooth 311.

Figure 4:
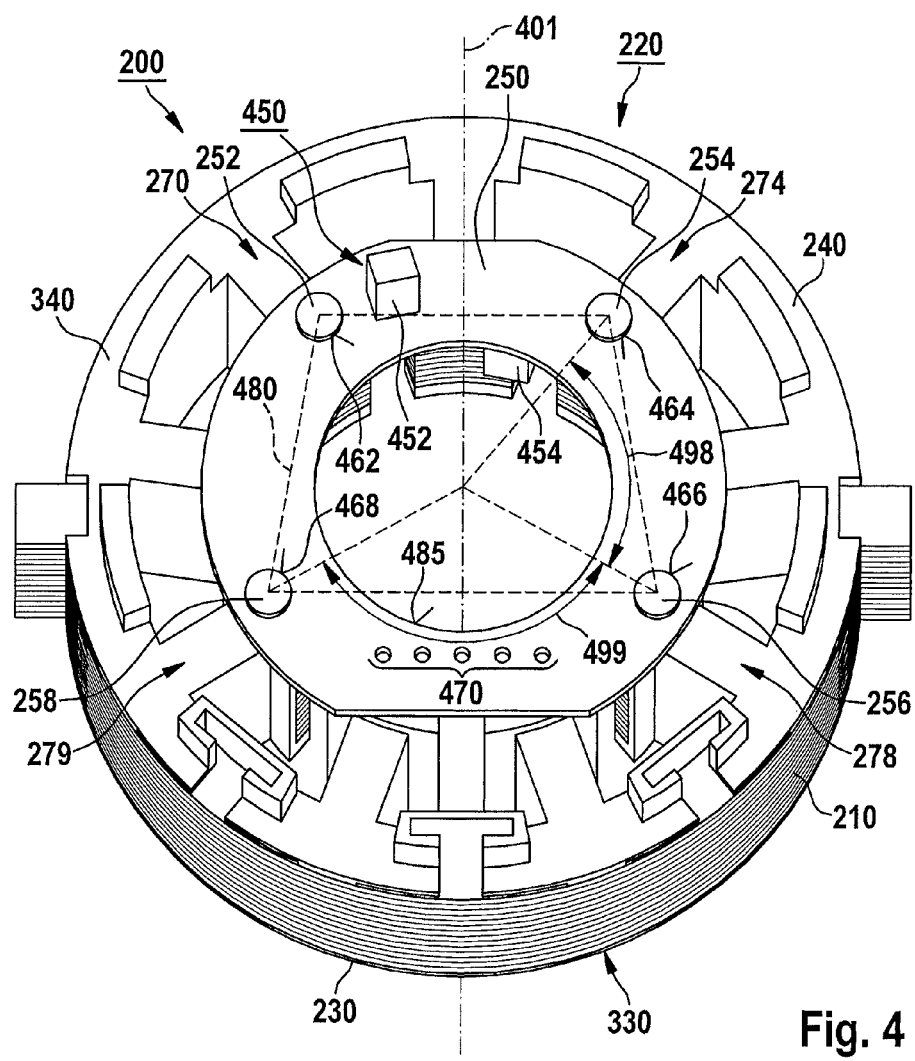
FIG. 4 shows a top view of the stator components from FIG. 3 having a circuit board mounted on the stator components.

FIG. 4 shows stator components 200 from FIGS. 2 and 3 with insulating body 220 on which circuit board 250 is positioned and mounted in a predefined alignment, as shown in FIG. 1 as an example, so that a representation of motor winding 260 from FIG. 3 has been omitted to simplify the drawing. Circuit board 250 has at least one rotational direction sensor 454 as an example, which is situated in a predefined axial position in or on drive motor 114 of FIG. 1 as a result of the positioning of circuit board 250 on insulating body 220. Rotational direction sensor 454 is designed in the manner of a Hall sensor, for example, and may be used to determine the rotational position of rotor components 117 of FIG. 1. Circuit board 250 may have an electronic circuit 450 having additional electronic components 452, which are also designed for motor control, for example, as well as a plurality of connecting elements 470 for electrical contacting of electronic components 450, of rotational direction sensor 454 and of motor winding 260 of FIG. 3.

According to one specific embodiment, circuit board 250 has an approximately central opening 486 for accommodating a rotor shaft of rotor components 117 from FIG. 1, e.g., motor shaft 116 from FIG. 1 as well as at least two and, for example, four positioning receptacles 462, 464, 466, 468. These are formed in the manner of positioning openings as an example to enable an accommodation or reach-through of pin-shaped positioning elements 252, 254, 256 and 258 of insulating body 220. In addition, positioning elements 252, 254, 256, 258 are fused in at least some sections in the area of positioning receptacles 462, 464, 466, 468 for mounting circuit board 250 on insulating body 220, e.g., by hot staking. However, it should be pointed out that alternative mounting methods, e.g., adhesive bonding or latching, are also possible within the context of the present invention.

As described in conjunction with FIG. 2 above, four pin-shaped positioning elements 252, 254, 256, 258 which are situated asymmetrically around a longitudinal axis 401 of stator components 200 are provided as an example, the asymmetrical configuration being achieved by a trapezoidal distribution on insulating body 220, for example, as indicated by a trapezoid 480 shown with broken lines. However, it should be pointed out that the trapezoidal configuration of positioning elements 252, 254, 256, 258 on insulating body 220 is only of an exemplary nature and is not to be understood as restricting the present invention to such an asymmetrical configuration. Instead an asymmetrical configuration may be achieved easily by situating the positioning elements 252, 254, 256, 258 on insulating body 220 with respect to the longitudinal axis 401 of stator components 200 and of insulating body 220 in such a way that an angle 498 between a first and a second positioning element 254, 256 is not equal to an angle 499 between the second and third positioning elements 258.

What is claimed is:

1. A power tool, comprising:
an electronically commutated drive motor;
stator components assigned to the electronically commutated drive motor, wherein the stator components include a stator core equipped with an insulating body;
a circuit board assigned to the drive motor; and
a positioning unit provided on the insulating body and configured to enable a positioning of the circuit board in a predefined alignment on the insulating body,
wherein the positioning unit is configured to enable a mounting of the circuit board on the insulating body,
wherein the positioning unit has at least two positioning elements which are situated in a predefined configuration on the insulating body,
wherein at least two positioning receptacles for accommodating the at least two positioning elements are formed on the circuit board,
wherein the positioning elements in the area of the positioning receptacles for mounting the circuit board on the insulating body are fused in at least some sections, wherein the positioning elements are situated asymmetrically on the insulating body with respect to a longitudinal axis of the stator components.

2. The power tool as recited in claim 1, wherein the circuit board is provided with at least one rotational direction sensor which is situated on a predefined axial position in the drive motor due to the positioning of the circuit board on the insulating body.

3. The power tool as recited in claim 1, wherein the insulating body and the positioning elements are each at least partially made of plastic, the positioning elements being at least one of (i) integrally molded on the insulating body and (ii) configured in one piece with the insulating body.

4. The power tool as recited in claim 1, wherein the positioning elements are configured in the form of pins, and the positioning receptacles are configured as positioning openings through which the positioning elements pass.

5. The power tool as recited in claim 1, wherein four positioning elements are provided and situated in a trapezoidal pattern on the insulating body.

6. A drive system for a power tool, comprising:
an electronically commutated drive motor;
stator components assigned to the electronically commutated drive motor, wherein the stator components include a stator core equipped with an insulating body;
a circuit board assigned to the drive motor; and
a positioning unit provided on the insulating body and configured to enable a positioning of the circuit board in a predefined alignment on the insulating body,
wherein the positioning unit is configured to enable a mounting of the circuit board on the insulating body,
wherein the positioning unit has at least two positioning elements which are situated in a predefined configuration on the insulating body,
wherein at least two positioning receptacles for accommodating the at least two positioning elements are formed on the circuit board,
wherein the positioning elements in the area of the positioning receptacles for mounting the circuit board on the insulating body are fused in at least some sections, wherein the positioning elements are situated asymmetrically on the insulating body with respect to a longitudinal axis of the stator components.

7. The power tool as recited in claim 1, wherein the positioning elements are fused in at least some sections in the area of the positioning receptacles by hot staking.

8. The drive system as recited in claim 6, wherein the positioning elements are fused in at least some sections in the area of the positioning receptacles by hot staking.

* * * * *